United States Patent
Gries

(10) Patent No.: US 8,819,257 B2
(45) Date of Patent: Aug. 26, 2014

(54) METHOD AND DEVICE FOR PERFORMING COMMUNICATION ON A BUS STRUCTURED NETWORK

(75) Inventor: Ulrich Gries, Hannover (DE)

(73) Assignee: Thomson Licensing S.A., Boulogne-Billancourt (FR)

( * ) Notice: Subject to any disclaimer, the term of this patent is extended or adjusted under 35 U.S.C. 154(b) by 820 days.

(21) Appl. No.: 10/523,210

(22) PCT Filed: Jun. 21, 2003

(86) PCT No.: PCT/EP03/06559
§ 371 (c)(1), (2), (4) Date: Jan. 27, 2005

(87) PCT Pub. No.: WO2004/015925
PCT Pub. Date: Feb. 19, 2004

(65) Prior Publication Data
US 2005/0262252 A1   Nov. 24, 2005

(30) Foreign Application Priority Data

Jul. 31, 2002   (EP) ..................................... 02017217

(51) Int. Cl.
*G06F 15/16* (2006.01)

(52) U.S. Cl.
USPC ........................................................ 709/231

(58) Field of Classification Search
USPC ................... 709/230, 231, 219, 238; 370/465
See application file for complete search history.

(56) References Cited

U.S. PATENT DOCUMENTS

| | | | | |
|---|---|---|---|---|
| 5,434,860 A | * | 7/1995 | Riddle | 370/232 |
| 5,621,913 A | * | 4/1997 | Tuttle et al. | 455/41.2 |
| 5,640,392 A | * | 6/1997 | Hayashi | 370/465 |
| 5,754,948 A | * | 5/1998 | Metze | 455/41.2 |
| 6,404,533 B1 | * | 6/2002 | Fergusson | 359/276 |
| 2001/0044866 A1 | * | 11/2001 | Smyers et al. | 710/126 |
| 2002/0026540 A1 | * | 2/2002 | Smyers | 710/8 |
| 2002/0041586 A1 | * | 4/2002 | Hayashino et al. | 370/338 |
| 2003/0035556 A1 | * | 2/2003 | Curtis et al. | 381/105 |
| 2003/0225953 A1 | * | 12/2003 | Ho | 710/305 |
| 2003/0231239 A1 | * | 12/2003 | Corzilius | 348/207.1 |
| 2004/0014426 A1 | * | 1/2004 | Moore | 455/70 |
| 2004/0174431 A1 | * | 9/2004 | Stienstra | 348/155 |

OTHER PUBLICATIONS

Schulzrinne at al.: "RFC 2326: Real time streaming protocol" Onlinel, Apr. 1998, IETF, Intenet.
Search Report Dated Oct. 20, 2003.

* cited by examiner

*Primary Examiner* — Jason Recek
(74) *Attorney, Agent, or Firm* — Tutunjian & Bitetto, P.C.

(57) ABSTRACT

The invention refers to a method for performing communication on a bus structured network between master device and slave devices using a bi-directional data stream DSA for secure communication and a unidirectional data stream DSI for real-time communication. According to the invention the unidirectional data stream DSI is used for a certain type of secure communication between a master device and at least one slave device.

8 Claims, 1 Drawing Sheet

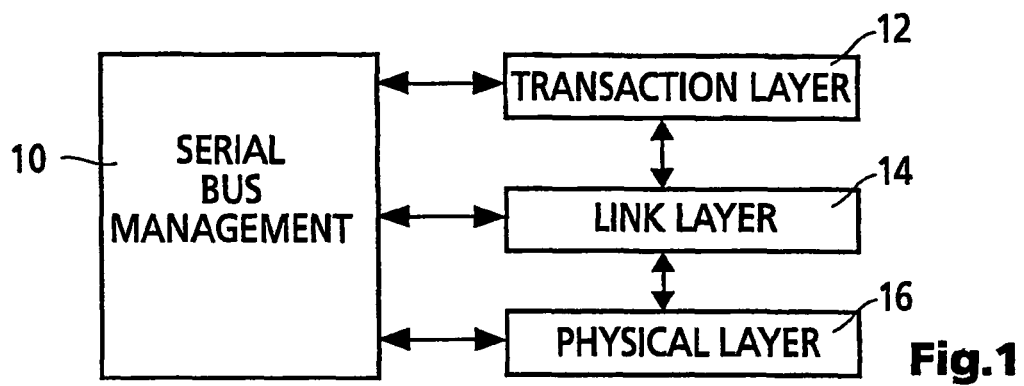
Fig.1
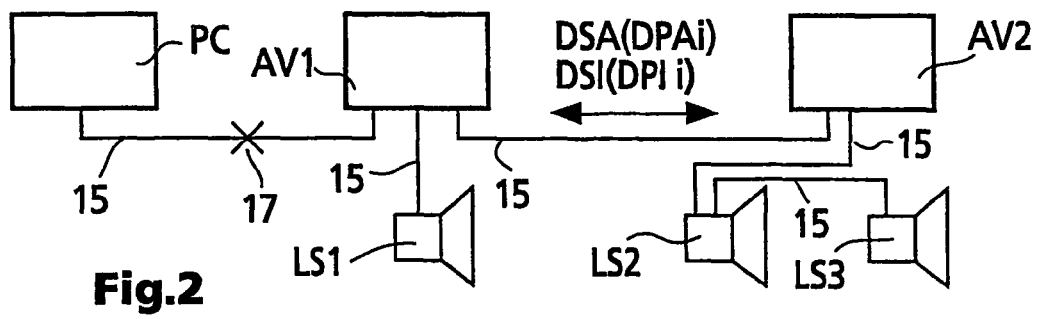
Fig.2
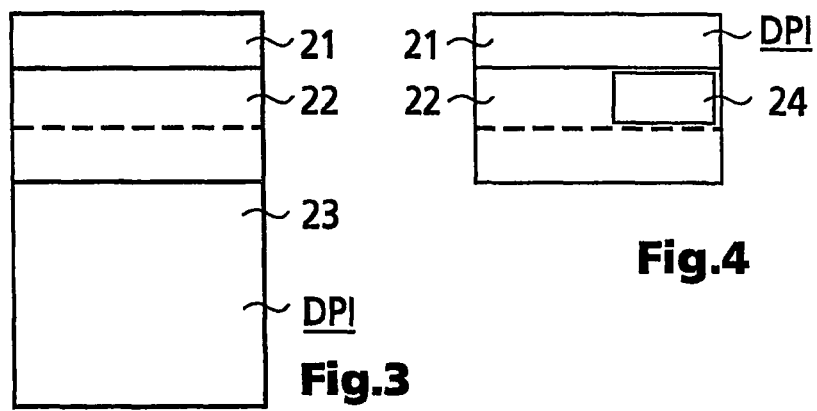
Fig.3
Fig.4
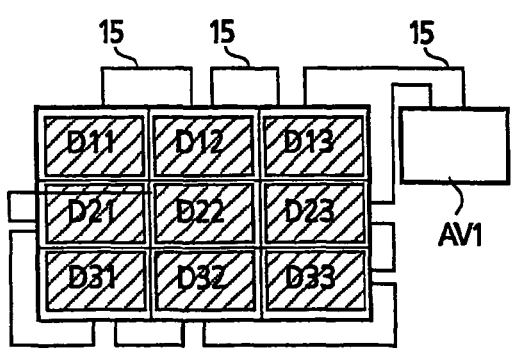
Fig.5
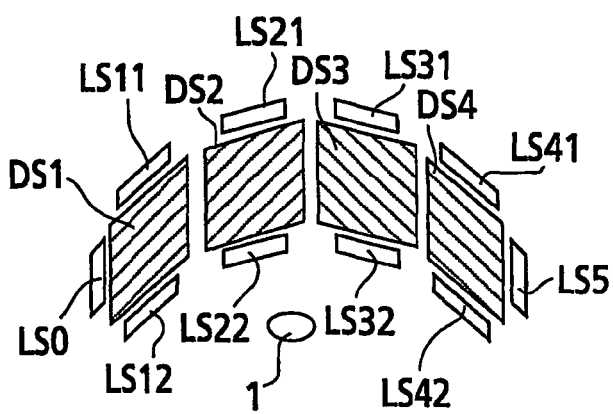
Fig.6

METHOD AND DEVICE FOR PERFORMING COMMUNICATION ON A BUS STRUCTURED NETWORK

This application claims the benefit, under 35 U.S.C. §365 of International Application PCT/EP03/06559, filed Jun. 21, 2003, which was published in accordance with PCT Article 21(2) on Jul. 10, 2003 in English and which claims the benefit of European patent application No. 02017217.7, filed Jul. 31, 2002.

FIELD OF THE INVENTION

The invention refers to a method and a device for performing communication on a bus structured network within which data transfer between different devices may happen in a unidirectional or isochronous manner and in a bi-directional or asynchronous manner.

BACKGROUND OF THE INVENTION

WO 98/47271 describes a protocol processor for manipulating a stream of data supporting both, isochronous and asynchronous format data transfer. In a certain embodiment, an isochronous data pipe is used to act as virtual asynchronous data pipe, transmitting all asynchronous data to be transferred.

Data, which are transferred in an isochronous manner reach a target device at a predetermined time while data, which are transferred in an asynchronous manner do not necessarily reach a device at a predetermined time. If data, which is transferred in an isochronous manner does not reach its target device it is not resent in order not to delay following isochronous data. Data, which is transferred in an asynchronous manner is checked for its reception by the target device. If such data does not reach its target device it is resent until it is assured that it has reached its target device. Usually control commands are sent in an asynchronous manner in order to assure that the control command has reached its target device.

Control commands having different target devices are sent as different items, one for each target device. Control commands thus do not reach their respective target devices at the same time. This is regarded to be disadvantages in case that undesired effects occur when said control commands do not reach their target devices at the same time.

SUMMARY OF THE INVENTION

According to the invention a method for performing communication on a bus structured network between master device and slave devices, which uses a bi-directional data stream for secure communication and a unidirectional data stream for real time communication lies in the fact that the unidirectional data stream is used for a certain type of secure communication between a master device and at least one slave device. This makes possible to provide certain types of secure information in real time to several slave devices. Advantageously, the unidirectional data stream is an isochronous data stream and the bi-directional data stream is an asynchronous one.

One advantageous type of secure communication information being transmitted via a unidirectional data stream is control commands. The inventive method is especially advantageous for control commands that control functionalities, which have an effect where non-timely execution is directly recognizable by a user. Such control commands are for example control of loudness of different loudspeakers, especially in a surround sound system, control of visual parameters as brightness, colour etc. in a multi-display video system, where two or more displays are used together to get an enlarged picture such as video wall, stereoscopic display, surround display etc.

Preferably, the certain type of secure communication, which is sent as unidirectional data stream, is repeatedly sent. This has the advantage that it increases the security, which is reduced when using the unidirectional data stream. For example, control commands are sent repeatedly to increase the chance that all slave devices concerned receive the control command even if some commands sent are not received due to noise or other disturbances or negative influences on the network. In this case, timely execution may not be reached, however, as it happens only in the rare case of disturbance, the negative recognizable effect to the user is less than using state of the art methods. Preferably, the number of repetitions is limited to a certain number, e.g. ten times repeated sending of the command, or a certain time, for example repeated sending until up to one second after the first item was sent.

Advantageously, the disturbance on the communication network is detected, the degree of disturbance is determined and, in case that the degree of disturbance exceeds a certain level, the use of unidirectional data stream for secure communication is reduced. This has the advantage that in case of strong disturbance, where a relatively high percentage of data is not received correctly, secure communication via unidirectional data stream is reduced in order to reduce negative influences caused by disturbance. This reduction is for example that secure communication via unidirectional data stream is sent to only a reduced number of devices, or for a reduced set of types of secure communication, or, secure communication via unidirectional data stream is completely stopped. The respective communication is preferably replaced by communication via bi-directional data streams to make sure correct reception for example of control commands. Detection of disturbance and its degree is for example reached by evaluating how many bi-directionally sent data are not received correctly. For example the number of not acknowledged receptions or the number of resent requests is compared to the total number of data sent. Also a device specific evaluation is proposed.

In case that a slave device needs to send secure communication information to several other devices, it is proposed that this slave device sends this information as secure information via the bi-directional data stream to a master device, which then transmits said information as certain type of secure communication via unidirectional data stream to the other devices. Depending on the configuration of the network and the actual task, a device may act as a master device in one situation and act as slave device under other circumstances. Slave devices, which according to certain types of bus structured networks or under certain circumstances are not permitted to issue unidirectional data streams, have now possibility to issue indirectly secure information to several other devices, which is received there at the same time. For example, the change of loudness might be requested by a user making use of a user interface being attached to or being itself a slave device of the network. This request is transmitted from the slave device to the master device, which itself issues a respective command via unidirectional data stream. An alternative solution is to permit slave devices to issue certain types of secure communication via unidirectional data streams. This has the advantage of increased responsiveness, might however not be able to be implemented in currently existing bus structures.

A slave device performs, according to the invention, scanning and decoding of both, bi-directional data streams and unidirectional data streams, which it receives from the bus, in order to retrieve secure communication information. That means that also the unidirectional data streams are scanned to detect data belonging to a certain type of secure communication.

According to the invention, a master device performs issuing of secure information to several slave devices using a unidirectional data stream in case of certain predefined types of secure communication information.

Preferably, a network, a slave device or a master device are provided with means to perform the methods according to the invention.

A more detailed description of embodiments of the invention will also give information of additional inventive features and advantages of the invention. However, the invention is not restricted to the embodiments described but also includes deviations therefrom, lying in the ability of a skilled person. In the figures

BRIEF DESCRIPTION OF THE DRAWINGS

FIG. 1 shows a serial bus protocol,
FIG. 2 shows a network for performing the inventive method,
FIG. 3 shows the structure of a usual isochronous data item,
FIG. 4 shows the structure of an inventive isochronous data item,
FIG. 5 shows an embodiment where the inventive method is used, and
FIG. 6 shows another embodiment where the inventive method is used.

DETAILED DESCRIPTION OF PREFERRED EMBODIMENTS

An example of a bus-structured network to which the invention refers is the IEEE 1394 bus. The IEEE 1394-1995 standard is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394 standard bus architecture provides multiple channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination. The IEEE 1394 standard provides a high-speed serial bus for interconnecting digital devices thereby providing a universal I/O connection. The IEEE 1394 standard defines a digital interface for the applications thereby eliminating the need-for an application to convert digital data to analog data before it is transmitted across the bus. Correspondingly, a receiving application will receive digital data from the bus, not analog data, and will therefore not be required to convert analog data to digital data. The cable required by the IEEE 1394 standard is very thin in size compared to other bulkier cables used to connect such devices. Devices can be added and removed from an IEEE 1394 bus while the bus is active. If a device is so added or removed the bus will then automatically reconfigure itself for transmitting data between the then existing nodes. A node is considered a logical entity with a unique address on the bus structure. Each node provides an identification ROM, a standardized set of control registers and its own address space.

The IEEE 1394 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device or application and the IEEE 1394 cable. The physical layer 16 also provides arbitration to ensure that all devices coupled to the IEEE 1394 bus have access to the bus as well as actual data transmission and reception. The link layer 14 provides data packet delivery service for both asynchronous and isochronous data packet transport. This supports both asynchronous data transport, using an acknowledgement protocol, and isochronous data transport, providing real-time guaranteed bandwidth protocol for just-in-time data delivery. The transaction layer 12 supports the commands necessary to complete asynchronous data transfers, including read, write and lock. The serial bus management block 10 contains an isochronous resource manager for managing isochronous data transfers. The serial bus management block 10 also provides overall configuration control of the serial bus in the form of optimizing arbitration timing, guarantee of adequate electrical power for all devices on the bus, assignment of the cycle master, assignment of isochronous channel and bandwidth resources and basic notification of effors.

FIG. 1 illustrates a protocol defined by the IEEE 1394 standard. An isochronous data pipe transmits and receives data for an application across a bus structure. Preferably, the bus structure is an IEEE 1394 standard bus structure. The isochronous data pipe is programmable and will execute a series of instructions on a stream of data in order to perform manipulations on the data required by the application. In a link circuit, an isochronous data pipe is included for transmitting and receiving isochronous data and an asynchronous data pipe is included for transmitting and receiving asynchronous data. The data from the isochronous data pipe and the asynchronous data pipe is multiplexed onto the bus structure. The data received from the bus structure is demultiplexed to the isochronous data pipe and the asynchronous data pipe. Alternatively, the isochronous data pipe is programmed to transmit and receive both isochronous and asynchronous data.

FIG. 2 shows diagrammatically a network for performing the inventive method. Several audio visual devices AV1, AV2, such as television display, video recorder, DVD player etc. are connected to loudspeakers LS1 to LS3 and a personal computer PC. In this embodiment audio visual device AV1 is configured as master device while the other devices AV2, LS1 to LS3, PC are slave devices. Each device conforms to a node of the network and is connected via a cable 15 to at least one other device of the network. Some of the devices as personal computer PC, loudspeaker LS1 and audiovisual device AV2 are directly connected to the master device audio visual device AV1. Other devices are indirectly connected to the master device as loudspeaker LS2, which is connected to audio visual device AV1 via audio visual device AV2 or loudspeaker LS3, which is connected directly to loudspeaker LS2 and via this indirectly to audio visual device AV1. Connector 17 indicates diagrammatically that devices may be disconnected from or connected to the network. Cables 15 are provided to transport an isochronous data stream DSI as well as an asynchronous data stream DSA, which itself consist of data packets DPIi, DPAi. In the embodiment, audio visual device AV1 might be a source of video, transmitting an isochronous video stream DSIvid to a display, here Audio visual device AV2, and an isochronous audio stream DSI to the loudspeakers LS1 . . . LS3.

Usually the volume of loudspeakers LS1 . . . LS3 in an IEEE 1394 network is controlled with asynchronous data packets DPAi, whereby a data packet DPAi must be sent to each loudspeaker LS1 . . . LS3 separately. Within the isochronous stream DSI the volume control information CIV automatically reaches all loudspeakers LS1 . . . LS3 receiving the selected isochronous stream DSI. The volume control information CIV reaches all loudspeaker LS1 . . . LS3 at the same time.

In an IEEE 1394 network all connected devices AV1, AV2, LS1 . . . LS3, PC may receive data either as stream DSA of asynchronous packet DPAi or as isochronous stream DSI. An asynchronous packet DPA is addressed to one or all nodes, i.e. to all devices. It is not possible to send one asynchronous packet DPA to a plurality of selected nodes. An asynchronous packet DPA will be acknowledged by the receiving node if received and executed correctly. If the asynchronous packet DPA was not received correctly the transmitting node may retry sending the packet after 100 ms delay up to 15 times or more. The delay between transmission and confirmation of an asynchronous packet DPA may be up to 15*100 ms. There is no warranty at which point of time the packet DPA will be sent over the bus. An isochronous stream DSI is used to transmit real time data with high bandwidth to several nodes who are able to receive the data stream DSI. The isochronous stream DSI has the warranty to be transmitted immediately. The usual way to control the volume of several digital loudspeakers LS1 . . . LS3 is to send an asynchronous packet DPA separately to every digital loudspeaker. Here, three packets DPA would be needed. It is not predictable at which time the volume control information CIV contained in the packets DPA reaches the different digital loudspeakers LS1 . . . LS2. If the volume control information CIV is sent in an isochronous stream DSI the volume control information CIV will be received by all digital loudspeakers L1 . . . L3 at the same time. The volume control information CIV will be sent in the same isochronous stream DSI as the digital audio data. The volume control information CIV may be sent repeatedly without any further expense. In this case the volume control information is not just "volume up" or "volume down" but a more precise command like "set volume to 20% of max volume" or something similar.

An advantage of the invention is that the volume control information CIV reaches automatically all nodes LS1 . . . LS3, which receive the isochronous stream DSI and the volume control can be executed at the same time in all participating digital loudspeakers LS1 . . . LS3. If the volume is controlled with asynchronous packets DPA there may be an execution difference of several milliseconds up to 1.5 seconds in worst case between the different digital loudspeakers LS1 . . . LS3, which time difference would be recognizable.

The volume control information CIV, which is transmitted in isochronous streams DSI is transmitted by the node which sends the isochronous stream DSI, here audio visual device AV1, whereas volume control information in asynchronous packets DPA may be sent by every node. It is, therefore, proposed that the node that needs to send volume control information transmits it first as asynchronous packet DPA to the node, which sends the isochronous stream DSI for including the control information into the isochronous stream DSI.

FIG. 3 shows the structure of a usual isochronous data packet DPI. It consists of an ISO header 21, a CIP header 22 and payload 23, which consists in case of 48 kHz sampling rate of 16 quadlet data, each quadlet having 32 bits.

FIG. 4 shows the structure of an isochronous data packet DPI used for certain type of secure communication, like volume control information CIV. It comprises the ISO header 21 and the CIP header 22 but no payload area 23. Inside the CIP header 22 there is a command area 24 for providing a certain type of secure communication, in the example described above the volume control information CIV. When any node receives the isochronous data packet DPI as shown, it checks within the CIP header 22 whether the command area 24 contains a command, whether this command is to be performed by it and performs it accordingly. A loudspeaker LSi would check for a volume control information CIV and perform it accordingly, while it would not recognize control information related to video display.

FIG. 5 shows an embodiment of the invention, in which six display devices Dij with i,j=1,2,3 forming a large video display wall. All display devices Dij are connected via cables 15 directly or indirectly to audio visual device AV1. In case of a change of brightness control signal CIB is to be issued, this will be done using the isochronous data stream DSI according to the invention. This makes possible that all displays Dij change brightness in the same way at the same time thus reducing any negative visual effect for a user.

FIG. 6 shows another embodiment where the invention is used. Display devices DS1 to DS4 are arranged surrounding a center point 1. Close to display devices DS1 to DS4 there are arranged loudspeakers LSi1, LSi2 with i=1-4 above and below display device DSi, respectively, and loudspeakers LS0 and LS5 at the side. This arrangement makes possible surround video and audio reception giving a user located at or near center point 1 the impression of close to complete surround feeling. Also in this case the display devices DSI and the loudspeakers LSij are connected via a network to a master device (not shown here). In case of change of loudness or brightness or any other audio or video characteristic, this will be transmitted according to the invention via the isochronous data stream DSI thus reducing or completely preventing any negative influence on the user. Would the related control information CIV not be transmitted in the isochronous data stream DSI, negative effects as balance or fading etc. would occur and the user would get a wrong impression about his or her position in the three dimensional space. Audio information received by the user would not completely coincide with visual information thus causing irritation.

In other words the invention solves the problem that in an IEEE 1394 network the volume control for loudspeakers LSi is sent to the loudspeakers LSi via asynchronous packets DPA. As these packets DPA need to be addressed to each single device, i.e. to each loudspeaker LSi separately, and as these packets DPA are transmitted with lower priority, i.e. not necessarily in real-time, the volume control command CIV might need up to 1.5 seconds before it is performed. This is a disadvantage. The long time is caused by the fact that the receipt of asynchronous packets is checked, and, if necessary, a non-received asynchronous packet DPA is resent. A further disadvantage is that different loudspeakers LSi will perform a change in volume at different times thus leading to an undesired sound impression to the user. According to the invention it is proposed to use the isochronous stream DSI, which is used to transport the real-time data, as video or audio data, to also transmit the volume control signal CIV. The isochronous stream DSI is transmitted in real-time, however, there is no feedback whether it is correctly received. Therefor the volume control signal CIV is transmitted repeatedly, thus compensating for loss of a single command. Volume control signals CIV are thus received at the same time at all loudspeakers LSi in the system thus volume is changed synchronously for all loudspeakers LSi.

The invention claimed is:

1. A method for performing communication on a bus structured network between a first device and a plurality of second devices, said first device and the plurality of second devices being separate stations in said network where there is a single bus configured to connect said first device and said plurality of second devices, the method comprising:
issuing real-time data communication from said first device to at least two of said plurality of second devices by means of an isochronous data communication through an isochronous data pipe;
embedding a first control command for said at least two of said plurality of second devices in an isochronous data packet of said isochronous data communication, wherein the isochronous data packet comprises a common isochronous header, wherein said first control command to said at least two of said plurality of second devices is located in the common isochronous header and is controlling a volume setting or a brightness setting in said at least two second devices, and wherein said plurality of second devices evaluate said header in order to determine if it includes a command which is to be performed by said second device.

2. The method according to claim 1, wherein said first control command is sent in a repeated manner.

3. The method according to claim 1, further comprising detecting a disturbance on the communication network, determining a degree of said disturbance, and reducing a use of said isochronous data communication for communicating said first control command if said degree of disturbance exceeds a predetermined level.

4. The method according to claim 1, wherein a second control communication from said first device includes a second control command, said first device communicating said second control command to said at least two of said plurality of second devices by means of isochronous data communication.

5. The method according to claim 1, further comprising issuing a second control communication from one of said plurality of second devices to said first device by means of an asynchronous data communication, wherein the second control command is embedded in an asynchronous data packet.

6. A network station for performing communication on a bus structured network between a first device and a plurality of second devices, said communication comprising issuing real-time data communication from said first device to said at least two of said plurality of second devices by means of an isochronous data communication through an isochronous data pipe, embedding a first control command for said at least two of said plurality of second devices in an isochronous data packet of said isochronous data communication, wherein the isochronous data packet comprises a common isochronous header, and the first control command is located in the common isochronous header, wherein said first control command to said at least two of said plurality of second devices is controlling a volume setting or a brightness setting in said at least two second devices, said network station including:
an interface to the network;
means for performing said isochronous data communication; and
means for using said isochronous data communication to communicate said first control command,
wherein said first control command is configured to control an audible parameter for at least one loudspeaker or a visible parameter for at least one display.

7. The network station according to claim 6, wherein said communication means include at least one of means for transmitting said first control command onto an isochronous channel and means for receiving said first control command from an asynchronous channel.

8. The network station according to claim 6, wherein the network interface is an IEEE-1394-network interface.

* * * * *